United States Patent [19]

Cataldo et al.

[11] 3,754,776

[45] Aug. 28, 1973

[54] ACTUATOR FOR MOVING A BELT ARRANGEMENT

[75] Inventors: Roy S. Cataldo, Birmingham; Edward W. Yott, St. Clair Shores, both of Mich.

[73] Assignee: General Motors Corporation, Detroit, Mich.

[22] Filed: May 15, 1972

[21] Appl. No.: 253,207

[52] U.S. Cl. .......................................... 280/150 SB
[51] Int. Cl. .............................................. B60r 21/10
[58] Field of Search .............................. 280/150 SB

[56] References Cited
UNITED STATES PATENTS
3,583,726   6/1971   Lindblad ...................... 280/150 SB
3,700,258   10/1972   Wize ............................ 280/150 SB

*Primary Examiner*—Leo Friaglia
*Assistant Examiner*—Robert R. Song
*Attorney*—W. E. Finken and Herbert Furman

[57] ABSTRACT

An actuator for moving a belt arrangement associated with a vehicle body door from an occupant restraining position to an easy-enter position in response to door opening movement. The actuator includes first and second pulleys mounted on the door for rotational movement with each other and having respective cable receiving spiraling portions which wind in opposite directions to each other and respectively receive first and second cables. The first cable extends from the first pulley and attaches to the belt arrangement, while the second cable extends from the second pulley and attaches to the vehicle body such that opening door movement increases the effective length of this cable between the second pulley and the vehicle body. This increase in effective length unwinds the second cable outwardly from the spiraling portion of the second pulley and rotates both pulleys such that the first cable winds inwardly onto the spiraling portion of the first pulley and pulls the belt arrangement forwardly toward easy-enter position more during the initial door opening movement than during later stages to aid occupant ingress to and egress from the vehicle body with the door in a partially open position.

7 Claims, 3 Drawing Figures

Patented Aug. 28, 1973 3,754,776

ACTUATOR FOR MOVING A BELT ARRANGEMENT

BACKGROUND OF THE INVENTION

This invention relates generally to an actuator for moving a belt arrangement associated with a vehicle body door from an occupant restraining position to an easy-enter position in response to opening movement of the door.

It is known to provide a vehicle body occupant restraining belt arrangement associated with a vehicle body door and movable between occupant restraining and easy-enter positions in response to opening and closing movement of the door such that an occupant is afforded access to the vehicle body with the door in open position and is restrained upon closing door movement without any deliberate effort. Full opening movement of the door is not possible in certain instances, such as when the vehicle is parked relatively close to another vehicle, and consequently the belt arrangement can move only partially toward easy-enter position as the door is opened to the fullest degree possible. This partial movement of the belt arrangement toward easy-enter position may not be sufficient to allow convenient occupant ingress to and egree from the vehicle body free of the belt arrangement.

SUMMARY OF THE INVENTION

This invention provides an actuator which moves a vehicle body occupant restraining belt arrangement toward easy-enter position more during the initial door opening movement than during later stages thereof to aid occupant ingress to and egress from the vehicle body with the door partially open.

One feature of the invention is that the actuator includes a first pulley rotatably mounted on the door or the vehicle body and having a spiraling portion which receives a first cable attached to the belt arrangement and wound inwardly onto this spiraling portion in response to opening door movement to provide the movement of the belt arrangement to easy-enter position. Another feature of the invention is that a second pulley drives the first pulley and includes a spiraling portion which spirals in a direction opposite to the spiraling portion of the first pulley and which receives a second cable extending between the vehicle body and door with an effective length that is increased during door opening movement to unwind this cable outwardly from the spiraling portion of the second pulley and thus rotate the pulleys with more rotation during the initial stages of door opening movement than during later stages such that the relative movement of the belt arrangement during initial door opening movement as compared to later stages thereof is further increased. Another feature of the invention is that the first pulley includes an outer arcuate portion with one end merging with the outer end of the associated spiraling portion of this pulley and with the first cable attached to this pulley at the other end of the outer arcuate portion such that the first cable winds on this outer arcuate portion during the initial stages of door opening movement and subsequently is wound inwardly on the spiraling portion in a manner further increasing the relative movement of the belt arrangement during initial door opening movement as compared to later stages of this movement.

BRIEF DESCRIPTION OF THE DRAWINGS

The above specified features and other features of this invention are readily apparent from the following description of the preferred embodiment and the drawings in which.

DESCRIPTION OF THE PREFERRED EMBODIMENT

Figures 1, 2, 3:
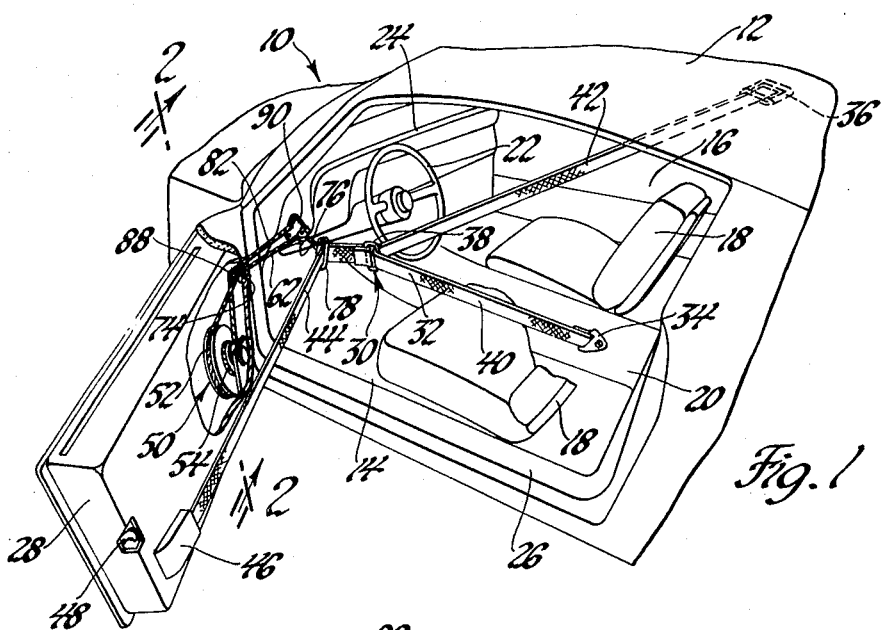
FIG. 1 is a perspective view of a vehicle body whose door is partially broken away to show an actuator which moves a belt arrangement associated with the door to the easy-enter position shown during door opening movement.
FIG. 2 is a view taken generally along line 2—2 of FIG. 1 and shows the actuator as including first and second pulleys fixed relative to each other and respectively receiving first and second cables, the first cable being attached to the belt arrangement to provide movement thereof, and the second cable being attached to the vehicle body such that its effective length between the pulley and the vehicle body is increased during door opening movement to provide the rotation of the pulleys and movement of the belt arrangement.
FIG. 3 is a view of the first pulley and cable taken generally along line 3—3 of FIG. 2 and showing this pulley with the first cable unwound as in door closed position.

Referring to FIG. 1 of the drawings, a vehicle body generally indicated by 10 includes a conventional roof 12 and floor 14 which cooperate to provide an occupant compartment 16. A pair of seats 18 are conventionally mounted on floor 14 on opposite sides of the usual transmission tunnel 20. The left-hand seat 18 is located in the usual manner behind a steering wheel 22 associated with a conventional instrument panel 24. Access to the left-hand seat 18 is by way of a door opening 26 selectively closed by a door 28 whose forward edge is pivoted to the vehicle body about a generally vertical axis in the usual manner.

An occupant restraining belt arrangement generally indicated by 30 includes a first belt 32 with a lower end secured to the transmission tunnel 20 by an attachment 34. The upper end of belt 32 is secured to the roof 12 by an attachment 36 at a location generally above attachment 34. This upper belt end may alternately be attached to the upper inboard side of the upstanding back of seat 18, this seat back being broken away in FIG. 1. An intermediate portion of belt 32 is slidably received by an apertured member 38 such that belt 32 defines a lap belt portion 40 and a shoulder belt portion 42. A second belt 44 has one end secured to apertured member 38 and another end received by a belt retractor 46 mounted on a lower rearward portion of door 28. This belt retractor 46 may be a conventional inertia responsive retractor similar to those used on current production vehicles or may alternately be a locking retractor whose locking is controlled by the latched or unlatched condition of door lock 48 associated with door 28. The retracting bias of retractor 46 normally retracts belt 44 and positions the lap and shoulder belt portions in occupant restraining positions when door 28 is closed.

An actuator indicated generally by 50 is mounted on door 28 and moves the belt arrangement 30 to the easy-enter position of FIG. 1, in a manner to be described, when door 28 is opened to allow convenient occupant access to seat 18. As can be seen by additionally referring to FIG. 2, the actuator 50 includes first and second pulleys 52 and 54 suitably splined to a common shaft 56. This shaft is rotatably supported by a pair of brackets 58 and 60 whose ends are suitably fixed relative to each other as by welding. The brackets 58 and 60 are suitably mounted on door 28 to thus position the pulleys 52 and 54 within the door as shown by FIG. 1. By referring additionally to FIG. 3, it can be seen that a cable 62 has one end secured to pulley 52 by a fitting 64 which is pivotally secured by a pin 66. This pin is fixed to pulley 52 at the counter-clockwise end of a cable receiving outer arcuate portion extending about the periphery of pulley 52 for 360 degrees. The clockwise end of this outer arcuate portion merges with the outer end of a cable receiving spiraling portion 70 of this pulley. The inner end of this spiraling portion approaches shaft 56.

With the door 28 in closed position, the cable 62 extends from fitting 64 upwardly as in FIG. 3 and through a suitable guide 72 in bracket 58. From guide 72, cable 62 extends over an idler pulley 74 mounted on door 28 by a pin 75, FIG. 2, and from there to and over an instrument panel mounted idler pulley 76 for attachment to a second apertured member 78 which slidably receives an intermediate portion of belt 44. Pulley 52 is driven counterclockwise from its FIG. 3 position by pulley 54 during door opening movement, in a manner to be described, such that cable 62 is first wound 360° on the outer arcuate portion 68 and then subsequently inwardly on the spiraling portion 70. Consequently, the apertured member 78 is pulled forwardly as this rotation occurs and the belt arrangement 30 is pulled forwardly to the easy-enter position as shown by FIG. 1 where belt 44 is extended from retractor 46. Since the cable 62 winds on the pulley portion having the greater diameter during the initial stages of the door opening movement, the forward movement of the belt arrangement will be greater during the initial stages of this movement as compared to later stages. Consequently, if the door 28 can only be moved to a partially open position, the belt arrangement 30 will nevertheless move forwardly to a large degree and allow an occupant to enter or leave the vehicle body 10 without interference with the belt arrangement 30. When the door 28 is closed, the retracting bias of retractor 46 will retract belt 44 and move the belt arrangement 30 rearwardly to an occupant restraining position without any deliberate effort on the part of the occupant. A spring return unit 80, see FIG. 2, biases shaft 56 to its relative position shown by FIG. 3 such that the cable 62 is unwound from pulley 52 during this door closing movement and the retracting bias of retractor 46 thus does not have to overcome the friction involved with actuator 50 to move the belt arrangement to the occupant restraining position.

The second pulley 54 receives a second cable 82 on a spiraling portion 84 which spirals in the opposite direction to that of spiraling portion 70 of pulley 52. Cable 82 has one end secured to pulley 54 at the outer end of spiraling portion 84 and is normally wound around the spiraling portion as shown by FIG. 2 when the door 28 is in closed position. A guide 86 mounted on bracket 58 receives a cable 82 which extends over an idler pulley 88 rotatably mounted on door 28 by pin 75 and from there to a suitable attachment 90 on the outer end of instrument panel 24. Idler pulley 88 and attachment 90 are positioned laterally to the vertical axis of swinging movement of door 28 such that the effective length of cable 82 between pulley 54 and attachment 90 is increased during door opening movement. Consequently, cable 88 unwinds outwardly from spiraling portion 84 and rotates pulley 54 such that it drives pulley 52 counter-clockwise from the position of FIG. 3 as previously described. The rotational movement of pulley 54 for a given unit change in the effective length of cable 82 will be greatest during the initial stages of this movement, since the diameter of spiraling portion 84 where the cable 82 leaves pulley 54 will be smallest during these stages of the movement. Consequently, the pulley 54 will rotate the shaft 56 and pulley 52 more during the initial opening movement of door 28 than during later stages. This manner of rotational actuation thus further increases the initial movement of belt arrangement 30 toward easy-enter position as door 28 is opened as compared to later stages of the door opening movement. When door 28 is closed and retractor 46 returns belt arrangement 30 to occupant restraining position, spring return unit 80 rotates shaft 56 to rewind cable 82 on spiraling portion 84 of pulley 54. A plate 92 is situated between pulleys 52 and 54 and prevents possible entanglement of cables 62 and 82.

It should be noted that it is also possible to mount the pulleys 52 and 54 on the vehicle body 10 instead of on the door 28 to provide the actuation of the belt arrangement in a somewhat reverse manner.

The invention thus provides an improved actuator for moving a belt arrangement from an occupant restraining position to an easy-enter position in response to door movement.

What is claimed is:

1. In combination with a vehicle body including a body member supporting a door member for movement between open and closed positions, and an occupant restraining belt arrangement generally adjacent the door member and movable between occupant restraining and easy-enter positions, an actuator for moving the belt arrangement from occupant restraining position to easy-enter position, the actuator comprising, a pulley rotatably mounted on one of the members and including a spiraling portion, an elongated flexible element with one end fixed relative to the pulley adjacent the outer end of the spiraling portion and with the other end of the flexible element attached to the belt arrangement, and means for rotating the pulley in response to opening movement of the door member to wind the flexible element inwardly on the spiraling portion and pull the belt arrangement from occupant restraining position toward easy-enter position such that the belt arrangement is moved more during the initial stages of this opening movement than during later stages to aid occupant ingress to and egress from the vehicle body with the door member partially open.

2. In combination with a vehicle body including a body member supporting a door member for movement between open and closed positions, and an occupant restraining belt arrangement generally adjacent the door member and movable between occupant restraining and easy-enter positions, an actuator for moving the belt arrangement from occupant restraining position to easy-enter position, the actuator comprising, a pulley rotatably mounted on one of the members and including an outer arcuate portion and a spiraling portion whose outer end merges with one end of the outer arcuate portion, an elongated flexible element with one end portion thereof fixed relative to the pulley adjacent the other end of the outer arcuate portion and with the other end portion of the flexible element attached to the belt arrangement, and means for rotating the actuator pulley in response to opening movement of the door member to wind the one end portion of the flexible element on the pulley and pull the belt arrangement from occupant restraining to easy-enter position, the flexible element winding on the outer arcuate portion of the pulley during the initial opening movement of the door member and winding inwardly on the spiraling portion during later stages of this opening movement such that the belt arrangement is moved more toward easy-enter position during the initial opening movement during later stages to aid occupant ingress to and egress from the vehicle body with the door member partially open.

3. In combination with a vehicle body including a body member supporting a door member for movement between open and closed positions, and an occupant restraining belt arrangement generally adjacent the door member and movable between occupant restraining and easy-enter positions, an actuator for moving the belt arrangement from occupant restraining position to easy-enter position, the actuator comprising, a first pulley rotatably mounted on one of the members and including an element receiving winding portion, a first elongated flexible element with one end fixed relative to the first pulley to allow winding of this flexible element on the winding portion thereof, the other end of the first flexible element being attached to the belt arrangement, a second pulley rotatably mounted to drive the first pulley and including an element receiving winding portion, a second elongated flexible element received by the winding portion of the second pulley with one end fixed relative thereto, the other end of the second flexible element being fixed relative to the other member to unwind the second flexible element from the second pulley during opening movement of the door member and rotate the pulleys such that the first flexible element is wound on the winding portion of the first pulley and pulls the belt arrangement toward easy-enter position, and a spiraling portion on one of the winding portions such that the belt arrangement is moved more during the initial opening movement of the door member than during later stages to aid occupant ingress to and egress from the vehicle body with the door member partially open.

4. In combination with a vehicle body including a body member supporting a door member for movement between open and closed positions, and an occupant restraining belt arrangement generally adjacent the door member and movable between occupant restraining and easy-enter positions, an actuator for moving the belt arrangement from occupant restraining position to easy-enter position, the actuator comprising, a first pulley rotatably mounted on one of the members and including an outer arcuate portion and a spiraling portion whose outer end merges with one end of the outer arcuate portion, a first elongated flexible element with one end fixed to the first pulley adjacent the other end of the outer arcuate portion, the other end of the first flexible element being attached to the belt arrangement, a second pulley mounted for rotation with the first pulley and including a spiraling portion which spirals in a direction opposite to that of the first spiraling portion, and a second elongated flexible element received by the spiraling portion of the second pulley with one element end attached thereto adjacent the outer end of this spiraling portion and with the other element end attached to the other member to unwind the second flexible element from the second pulley during opening movement of the door member and rotate the pulleys more during the initial stages of this opening movement than during later stages, the first flexible element being wound on the outer arcuate portion of the first pulley during the initial rotation of the pulleys and on the spiraling portion thereof during later stages of this rotation such that the belt arrangement is pulled toward easy-enter position during opening movement of the door member and the movement of the belt arrangement is greater during the initial stages of this opening movement than during later stages to aid occupant ingress to and egress from the vehicle body with the door member partially open.

5. The combination of claim 4 wherein the actuator includes means biasing the pulleys to a position where the second flexible element is wound on the second pulley and the first flexible element is unwound from the first pulley.

6. The combination of claim 4 wherein the pulleys are rotatably mounted on the door member and a pair of idler pulleys guide the first and second flexible elements from the door member.

7. In combination:
a vehicle body having an occupant seat, and a door adjacent the seat and movable between open and closed positions;
an occupant restraint unit effective when the door is closed to restrain an occupant of the seat, the restraint unit having an attachment portion movable forwardly relative to the seat to permit occupant ingress and egress with respect to the seat relatively free of the restraint unit;
the door and vehicle body defining mounting portions which move away from each other as the door is opened;
a pulley rotatably mounted on one of the mounting portions and having first and second element receiving portions;
a first generally elongated flexible element extending from the first element receiving portion of the pulley to the other mounting portion so that the pulley is rotated as the door is opened;
a second generally elongated flexible element extending from the second cable receiving portion of the pulley to the attachment portion of the restraint unit so as to wind on this portion of the pulley as the pulley is rotated in response to door opening movement and to move the restraint unit to allow the occupant ingress and egress relative to the seat; and
one of the element receiving portions of the pulley having varying radii relative to the axis of pulley rotation such that the restraint unit is moved a relatively greater amount during the initial door opening movement than during later stages thereof to aid occupant access to the seat when the door is partially open.

* * * * *